(12) United States Patent
Winkler et al.

(10) Patent No.: US 8,186,738 B2
(45) Date of Patent: May 29, 2012

(54) HOLDING DEVICE FOR CLOSING CAPS OF A FUEL SUPPLY DEVICE

(75) Inventors: Bernd Winkler, Lehre (DE); Sven Falke, Helmstedt (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 265 days.

(21) Appl. No.: 12/721,018

(22) Filed: Mar. 10, 2010

(65) Prior Publication Data

US 2010/0230992 A1     Sep. 16, 2010

(30) Foreign Application Priority Data

Mar. 10, 2009   (DE) .......................... 10 2009 012 403

(51) Int. Cl.
   *B60K 15/05*   (2006.01)
(52) U.S. Cl. ............................. 296/97.22; 220/DIG. 33
(58) Field of Classification Search ........... 220/DIG. 33; 296/97.22
   See application file for complete search history.

(56) References Cited

U.S. PATENT DOCUMENTS

| | | | | |
|---|---|---|---|---|
| 4,653,711 | A | * | 3/1987 | Marshell ..................... 248/205.3 |
| 4,746,089 | A | * | 5/1988 | Clapper ...................... 248/309.4 |
| 4,811,765 | A | * | 3/1989 | Giha ............................... 141/392 |
| 5,165,749 | A | * | 11/1992 | Sheppard ................... 296/97.22 |
| 5,580,019 | A | * | 12/1996 | Glesser ...................... 248/309.1 |
| 6,834,688 | B2 | * | 12/2004 | Ono et al. ......................... 141/94 |
| 7,566,089 | B2 | * | 7/2009 | Alfaro ......................... 296/97.22 |
| 2005/0280276 | A1 | * | 12/2005 | McComsey ................ 296/97.22 |
| 2009/0145906 | A1 | | 6/2009 | Freiberg |

FOREIGN PATENT DOCUMENTS

| | | | |
|---|---|---|---|
| DE | 4034848 | A1 * | 5/1992 |
| DE | 3706080 | C2 | 1/1994 |
| DE | 29921802 | U1 | 3/2000 |
| DE | 10220899 | A1 * | 1/2004 |
| DE | 10231718 | A1 * | 4/2004 |
| DE | 10303863 | A1 | 11/2004 |
| DE | 102007059150 | A1 | 6/2009 |
| FR | 2760697 | A1 | 9/1998 |
| FR | 2914592 | A1 * | 10/2008 |
| JP | 04046823 | A * | 2/1992 |
| JP | 04314623 | A * | 11/1992 |
| JP | 05201263 | A * | 8/1993 |

(Continued)

OTHER PUBLICATIONS

German Search Report dated Nov. 25, 2009.

*Primary Examiner* — Glenn Dayoan
*Assistant Examiner* — Paul Chenevert
(74) *Attorney, Agent, or Firm* — Laurence A. Greenberg; Werner H. Stemer; Ralph E. Locher

(57) ABSTRACT

A motor vehicle has a fuel supply device provided in a bowl indentation of the vehicle body. A closing cap closes the fuel supply device and a cover flap is articulated on the motor vehicle that, in the closed state, covers the bowl body of the body. Vehicles of the same model series must have different closing caps for different sales markets. Here, at least two different holding devices for holding the closing cap are therefore provided in the region of the fuel supply device. Differently designed closing caps for closing the fuel supply device can thus be received.

15 Claims, 3 Drawing Sheets

FOREIGN PATENT DOCUMENTS

| | | | | |
|---|---|---|---|---|
| JP | 06144027 | A | * | 5/1994 |
| JP | 08188058 | A | * | 7/1996 |
| JP | 09040094 | A | * | 2/1997 |
| JP | 2003146092 | A | * | 5/2003 |
| JP | 2006182046 | A | | 7/2006 |
| JP | 2008024069 | A | * | 2/2008 |
| JP | 2009001260 | A | * | 1/2009 |
| JP | 2009061826 | A | * | 3/2009 |
| WO | WO 9104885 | A1 | * | 4/1991 |
| WO | WO 2005035290 | A1 | * | 4/2005 |

* cited by examiner

HOLDING DEVICE FOR CLOSING CAPS OF A FUEL SUPPLY DEVICE

CROSS-REFERENCE TO RELATED APPLICATION

This application claims the priority, under 35 U.S.C. §119, of German patent application DE10 2009 012 403.9, filed Mar. 10, 2009; the prior application is herewith incorporated by reference in its entirety.

BACKGROUND OF THE INVENTION

Field of the Invention

The invention lies in the automotive field. More specifically, the present invention relates to a motor vehicle with a fuel supply device provided in a bowl body of the motor vehicle body, with a closing cap closing the fuel supply device and with a cover flap which is articulated on the motor vehicle and in the closed state covers the recess of the body.

German patent specification DE 37 06 080 C2 describes a generic arrangement which comprises a cover flap, a cap for closing a fuel supply device, and a holder, by way of which the cap can be received in the demounted state. There, the holder is arranged as a transverse strut and can be brought by way of its end portions into engagement with mounting recesses on the cover flap.

It happens, however, that vehicles of the same model series must have different closing caps for different sales markets in order to conform to the different regional conditions and statutory requirements of various sales markets. It therefore proves to be expedient that closing caps of different design for closing a fuel supply device can be received by holding devices arranged on the motor vehicle.

SUMMARY OF THE INVENTION

It is accordingly an object of the invention to provide a holding device for closure caps of a fuel supply device which overcomes the above-mentioned disadvantages of the heretofore-known devices and methods of this general type and which provides for such a holding device that is suitable for receiving different closing caps.

With the foregoing and other objects in view there is provided, in accordance with the invention, a motor vehicle, comprising:

a motor vehicle body formed with a bowl indentation;

a fuel supply device disposed in said bowl indentation of said vehicle body;

a closing cap for closing said fuel supply device; and a cover flap articulated on said motor vehicle body covering said bowl indentation of said motor vehicle body in a closed state thereof;

at least two holding devices disposed in a vicinity of said fuel supply device, with at least one of said holding devices being configured for holding said closing cap.

In other words, the objects of the invention are achieved in that at least two, mutually different, holding devices are provided, which are arranged in the region of the fuel supply device for the holding of closing caps. This affords a repository facility for closing caps of different design so that these cannot cause to or on the body any contamination or other surface alterations, such as paint scratches or dents, after they have been released from the fuel supply device.

The fuel supply device may in this case be a tank filler neck for supply of liquid or gaseous fuels, but also a device for the supply of electrical energy. The closing cap may therefore be designed as a cap for the closing of tank filler necks, but also as a cap for closing a plug or coupling arrangement.

In a preferred refinement of the invention, at least one of the holding devices is arranged in the region of the cover flap. This arrangement ensures unimpeded access to the fuel supply device even when a closing cap is held by one of the holding devices.

The arrangement of at least one of the holding devices on a carrying arm and/or hinge assigned to the cover flap has an especially advantageous effect upon the manufacture of these vehicle parts. Thus, it would be possible to use the same carrying arm or the same hinge for a multiplicity of vehicle models, while the tank flap can be produced according to the design-related requirements of the respective vehicle model.

In accordance with an added refinement of the invention, the holding devices are formed by at least one depression and/or at least one recess in the region of the cover flap and/or of the carrying arm, in order to make it possible to have a safe repository for the closing cap.

In an especially advantageous refinement of the invention, at least one of the holding devices is formed by an elongate and/or essentially round or angular depression and/or recess. In this case, the elongate depression and/or recess may have an arcuate configuration, so as to match with the form of a closing cap, on which a collar may be integrally formed, which, in conjunction with the depression and/or recess, ensures that the closing cap is reliably held. For this purpose, a peg or pin arranged on the closing cap may be brought into connection with a round or angular recess.

In a preferred refinement of the invention, the depression and/or the recess have/has at least partially peripheral elevation, so that the closing cap can be held in a tilt-proof manner. The elevation may in this case be configured in the form of a rib in order to support the closing cap in the region of its collar.

Further, a preferred refinement of the invention provides, in the region of the holding devices, a bearing surface which is suitable for supporting the closing cap. The support is especially advantageously arranged below the holding device, in order to support closing caps of elongate design in a tilt-proof manner. In this case, the bearing surface may be designed in a material-saving way as a rib.

Other features which are considered as characteristic for the invention are set forth in the appended claims.

Although the invention is illustrated and described herein as embodied in a holding device for closing caps of a fuel supply device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
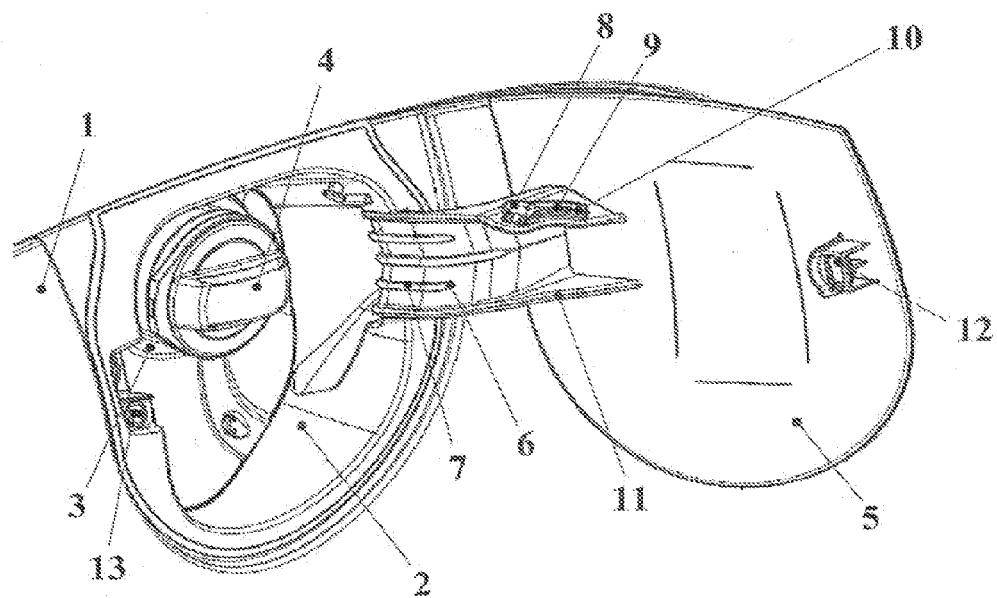
FIG. 1 is a perspective view of a detail of a motor vehicle with a vehicle body having a bowl body in the region of which a fuel supply device is arranged.

Referring now to the figures of the drawing in detail and first, particularly, to FIG. 1 thereof, there is shown a detail of a motor vehicle with a body 1 having a recess in the form of a bowl body 2 or bowl indentation 2 in the region of which a fuel supply device 3 is arranged, in a perspective view. A fuel cap or closing cap 4 closes the fuel supply device 3. A cover flap 5 or lid 5 is pivotally disposed between a closed position and an open position. Here, it is shown in a position releasing the fuel supply device 3, that is to say in the open position. In the region of a carrying arm 6 which is connected to a hinge 7 and is pivotally mounted on the motor vehicle by means of the latter, a first holding device 8 as a round recess is formed which has adjoining it a second holding device 9 configured as an arcuate recess. The holding devices are partially bordered by an elevation 10 formed as a rib. A support 11 for the bearing contact of the closing cap 4 is arranged in the lower part of the carrying arm 6 and is designed as a supporting rib. Further, the cover flap has a flap fastening 12, and the body has a stop buffer 13 for the bearing contact 2 of the cover flap 5.

Figure 2:
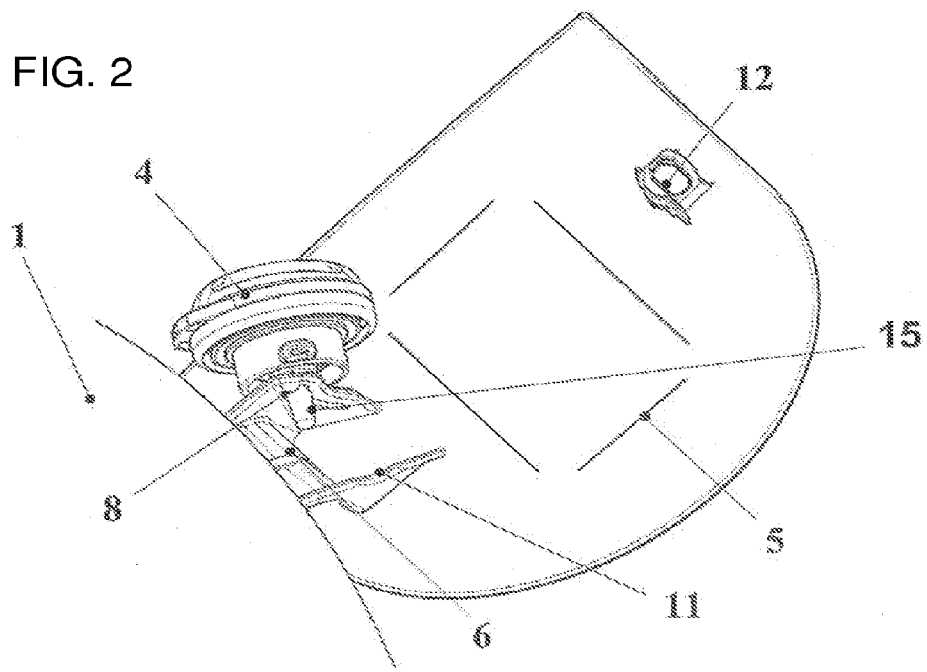
FIG. 2 is a perspective view of a detail of the motor vehicle with a body in the region of a fuel supply device.

FIG. 2 also shows a detail of the motor vehicle with a body 1 in the region of a fuel supply device 3 in a perspective view. The closing cap 4 is held by the first holding device 8. The closing cap has in this case a peg 15 which has been brought into engagement with the first holding device 8.

Figure 3:
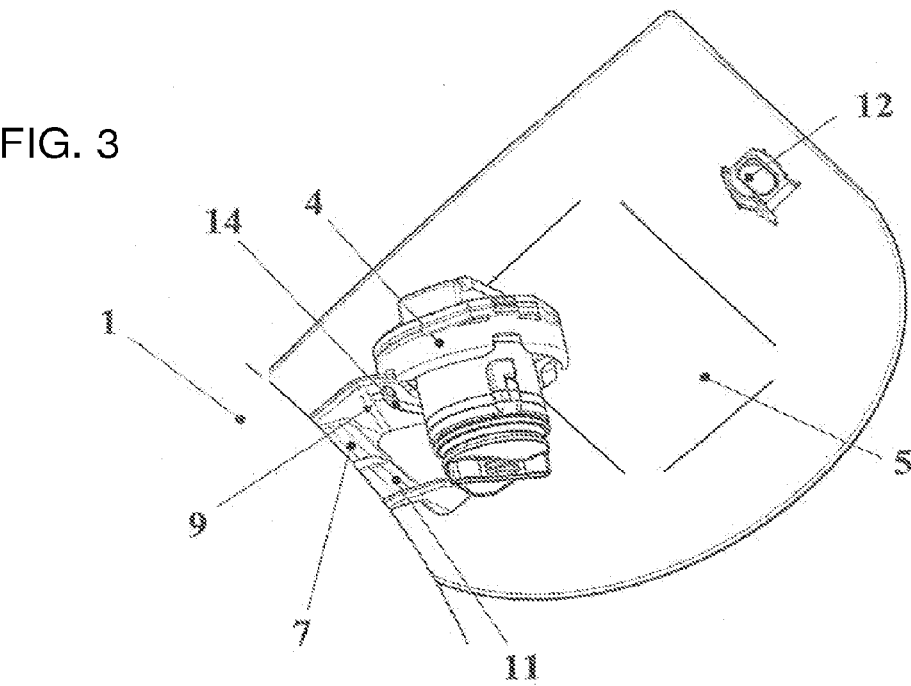
FIG. 3 is a perspective view of a detail of the motor vehicle with a body in the region of a fuel supply device.

FIG. 3 likewise shows a detail of the motor vehicle with the body 1 in the region of the fuel supply device 3 in a perspective view. The closing cap 4 is held by the second holding device 9. The closing cap in this case has a partially peripheral collar 14 which has been brought into engagement with the second holding device 9. For holding the closing cap in a tilt-proof manner, the carrying arm 6 has a bearing surface 11 on which the closing cap is supported.

Figure 4:
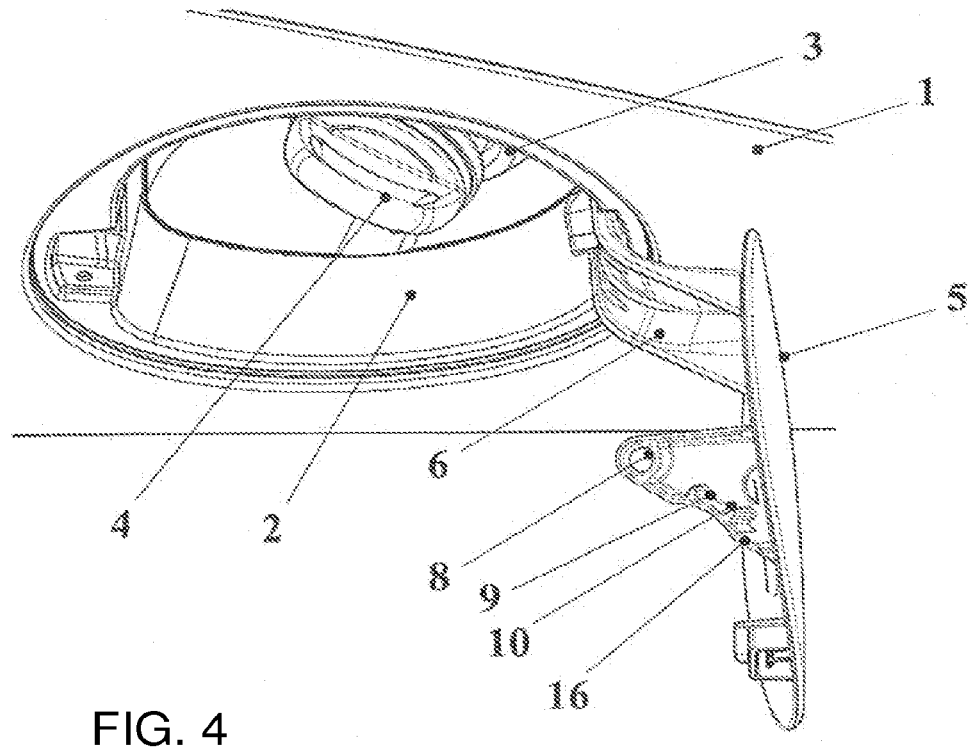
FIG. 4 is a perspective view of a detail of the motor vehicle with the body in the region of a fuel supply device.

FIG. 4 likewise shows a detail of the motor vehicle with the body 1 in the region of a fuel supply device 3 in a perspective view. The closing cap 4 closes the fuel supply device 3 and the cover flap 5 is pivoted away from the body 1 in order to release the fuel supply device 3. The first holding device 8 in the form of a circular recess is formed on the cover flap 5 on a web 16. The second holding device 9 is arranged as an approximately arcuate recess on the margin of the web 16.

The invention claimed is:

1. A motor vehicle, comprising:
   a motor vehicle body formed with a bowl indentation;
   a fuel supply device disposed in said bowl indentation of said vehicle body;
   a closing cap for closing said fuel supply device; and
   a cover flap articulated on said motor vehicle body covering said bowl indentation of said motor vehicle body in a closed state thereof;
   at least two holding devices disposed in a vicinity of said fuel supply device, with at least one of said holding devices being configured for holding said closing cap.

2. The motor vehicle according to claim 1, wherein said cover flap is connected to a carrying arm and a hinge for pivoting.

3. The motor vehicle according to claim 2, wherein at least one of said holding devices is disposed on said carrying arm.

4. The motor vehicle according to claim 1, wherein a bearing surface for supporting said closing cap is formed at said fuel supply device.

5. The motor vehicle according to claim 4, wherein said bearing surface is formed in a region of a carrying arm or in a region of said cover flap.

6. The motor vehicle according to claim 1, wherein a least one of said holding devices is disposed at said cover flap.

7. The motor vehicle according to claim 6, wherein at least one of said holding devices is at least one of a depression or a recess.

8. The motor vehicle according to claim 7, wherein at least one of said holding devices is at least one of an elongated depression or an elongated recess.

9. The motor vehicle according to claim 8, wherein said depression or recess is matched, at least in regions, to a shape of said closing cap.

10. The motor vehicle according to claim 7, wherein at least one of said holding devices is a substantially round.

11. The motor vehicle according to claim 10, wherein said substantially round depression or recess is matched, at least in regions, to a shape of the closing cap.

12. The motor vehicle according to claim 7, wherein at least one of said holding devices is a substantially polygonal.

13. The motor vehicle according to claim 12, wherein said substantially polygonal depression or recess is matched, at least in regions, to a shape of said closing cap.

14. The motor vehicle according to claim 7, wherein said depression or recess is formed with an at least partially peripheral elevation.

15. The motor vehicle according to claim 14, wherein said elevation is formed as a rib.

* * * * *